United States Patent
Ripberger

(10) Patent No.: US 8,495,067 B2
(45) Date of Patent: *Jul. 23, 2013

(54) PARTITIONING MANAGEMENT OF SYSTEM RESOURCES ACROSS MULTIPLE USERS

(75) Inventor: Richard A. Ripberger, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/493,128

(22) Filed: Jun. 11, 2012

(65) Prior Publication Data

US 2012/0254182 A1  Oct. 4, 2012

Related U.S. Application Data

(63) Continuation of application No. 12/964,668, filed on Dec. 9, 2010.

(51) Int. Cl.
*G06F 7/00* (2006.01)

(52) U.S. Cl.
USPC ............ 707/737; 707/641; 707/662; 707/693

(58) Field of Classification Search
None
See application file for complete search history.

(56) References Cited

U.S. PATENT DOCUMENTS

| | | | |
|---|---|---|---|
| 5,765,154 A | 6/1998 | Horikiri et al. | |
| 5,905,245 A | 5/1999 | Tanaka | |
| 6,393,485 B1 | 5/2002 | Chao et al. | |
| 6,438,705 B1 | 8/2002 | Chao et al. | |
| 6,543,690 B2 | 4/2003 | Leydier et al. | |
| 7,228,351 B2 | 6/2007 | Arwe | |
| 7,340,646 B2 | 3/2008 | Haustein et al. | |
| 2002/0176434 A1* | 11/2002 | Yu et al. ......................... | 370/422 |
| 2003/0018701 A1* | 1/2003 | Kaestle et al. ................ | 709/201 |
| 2004/0054866 A1* | 3/2004 | Blumenau et al. ............ | 711/202 |
| 2006/0069889 A1 | 3/2006 | Nagaya et al. | |
| 2007/0067366 A1* | 3/2007 | Landis .......................... | 707/205 |
| 2008/0140824 A1* | 6/2008 | Jain et al. ...................... | 709/224 |
| 2008/0168473 A1* | 7/2008 | Armstrong et al. ........... | 719/318 |
| 2009/0292843 A1 | 11/2009 | Haban et al. | |
| 2010/0011002 A1* | 1/2010 | Gerovac et al. ................ | 707/10 |
| 2010/0106934 A1* | 4/2010 | Calder et al. .................. | 711/173 |
| 2010/0293140 A1* | 11/2010 | Nishiyama .................... | 707/636 |

OTHER PUBLICATIONS

Stephen Chong et al., "Secure Web Applications via Automatic Partitioning," ACM 978-1-59593-591-05/07/0010, 2007, pp. 31-44.
Johnson Kin et al., "A Technique for QoS-based System Partitioning,"IEEE ISBN 0-7803-5974-7, 2000, pp. 241-246.

(Continued)

*Primary Examiner* — Mohammad S Rostami
(74) *Attorney, Agent, or Firm* — Griffiths & Seaton PLLC

(57) ABSTRACT

A resource group attribute is assigned to a storage resource object representing at least one of the plurality of storage resources in a system configuration of the computing storage environment. The resource group attribute includes a selectable value indicating a resource group object to which the storage resource object is associated. A resource group label is provided in the resource group object and is a string having no wildcards. A user resource scope is assigned to a user ID and a value of the user resource scope provides a mechanism to match to the resource group label. The user ID is authorized to perform one of creating, deleting, modifying, controlling, and managing storage resources with an association to a resource group.

6 Claims, 5 Drawing Sheets

OTHER PUBLICATIONS

Carol Anderer et al., "Multimedia Magic: Moving Beyond Text," ACM 978-1-59593-634-09/07/0010, 2007, pp. 1-3.

Marijn Janssen et al., "Issues in Relationship Management for Obtaining the Benefits of a Shared Service Center," ACM 1-58113-930-06/04/10, 2004, pp. 219-228.

Extron Electronics, "SW USB Series—Two and Four Input USB Switches," 2008, 4 pages.

"Home Digital Network Interface Specification With Copy Protection," The Society of Cable Telecommunications Engineers (SCTE), 2010, 33 pages.

U.S. Appl. No. 12/964,675, filed Dec. 9, 2010, entitled "Hierarchical Multi-Tenancy Management of System Resources in Resource Groups".

U.S. Appl. No. 12/964,684, filed Dec. 9, 2010, entitled "Management of Copy Services Relationships Via Policies Specified on Resource Groups".

U.S. Appl. No. 12/964,699, filed Dec. 9, 2010, entitled "Management of Host Passthrough and Session Commands Using Resource Groups".

* cited by examiner

PARTITIONING MANAGEMENT OF SYSTEM RESOURCES ACROSS MULTIPLE USERS

CROSS-REFERENCE TO RELATED APPLICATIONS

This application is a Continuation of U.S. patent application Ser. No. 12/964,668, filed on Dec. 9, 2010.

BACKGROUND OF THE INVENTION

1. Field of the Invention

The present invention relates in general to computers, and more particularly to method embodiments for partitioning management of system resources across multiple users in a computing storage environment.

2. Description of the Related Art

Computers and computer systems are found in a variety of settings in today's society. Computing environments and networks may be found at home, at work, at school, in government, and in other settings. Computing environments increasingly store data in one or more storage environments, which in many cases are remote from the local interface presented to a user.

These computing storage environments may use many storage devices such as disk drives, often working in concert, to store, retrieve, and update a large body of data, which may then be provided to a host computer requesting or sending the data. In some cases, a number of data storage subsystems are collectively managed to provide storage for a number of host systems. Each host system provides one or more host logical partitions that are each capable of running an operating system that supports running one or more applications. Each host logical partition is allowed to access certain storage devices on the data storage subsystems. In this way, a general purpose computing environment allows the processing and storage resources of the configuration to be partitioned and assigned to various workloads associated with one or more applications. In some environments, a set of workloads may be associated with a specific tenant that is using a subset of the computing environment such that there may be multiple tenants that are concurrently running on various subsets within the environment. In this way, a general purpose multi-host system and multi-storage system computing environment can be configured to support multi-tenancy or multiple workloads In some situations, data storage is provided locally and also provided to a remote storage environment to enhance data reliability by providing redundancy. In these situations, several instances of data may be stored in multiple locations to provide for failsafe recovery. Storage environments such as network attached storage (NAS) and storage area networks (SAN) allow for these implementations, and for the implementation and maintenance of a larger amount of storage. SAN, NAS and similar systems are increasingly used for supplying a variety of services, such as email, database, applications, and other services. Data storage subsystems also are increasingly supporting the ability to perform outboard replication across SANs, LANs, and WANs to facilitate the replication of data for backup or mirroring purposes.

SUMMARY OF THE DESCRIBED EMBODIMENTS

Most computing environments have configurable attributes that are managed through a user interface. The user interface typically provides a mechanism to authenticate the user through mechanisms such as a user ID and a password. Different users may have different roles such as an administrator, operator, general user, etc. In a system that provides virtualization of resources, logical resources are typically configured from physical resources. The logical resources can be managed within the system via the creation and manipulation of objects in a database that represent the logical resources. As such when a user creates a logical resource, the system remembers that the logical resource exists by creating an object in the database that has attributes that define the logical resource and that may also designate the physical resources associated with that object.

As an example of the above description, a storage controller in a computing storage environment may provide for the creation of logical volumes that are accessible by host systems which are created from storage capacity that is available to the storage controller on attached storage devices such as disks or redundant array of independent disk (RAID) arrays. A user creates a logical volume with a given capacity and using a particular type of physical storage through the user interface, and the system implementation is such that the logical volume's host address, capacity, and physical storage type are represented in a data structure whose template is defined by a logical volume class. A given instance of the template is referred to as an instance or object of the logical volume class.

In general, it is desirable to provide some mechanism to allow specific users to have access to specific subsets of the object classes in the system configuration. Referring again to the above example, a set of users (A) may be designated to manage the logical volume created on the storage controller which are to be accessed by a given set of host systems (a). A different set of users (B) may be designated to manage the logical volumes created on the storage controller that are to be accessed by a second set of host systems (b). It is desirable that the configuration methods of the system provide mechanisms to prevent users in user set (A) from affecting logical volumes that are associated with user set (B) and vice versa.

Accordingly, and in view of the foregoing, various method embodiments for partitioning management across multiple users of a plurality of storage resources organized into a plurality of resource groups in a computing storage environment are provided. A resource group is a collection of storage resources (e.g. volumes, etc.) that has a resource group label that uniquely identifies the resource group and additionally can be assigned a set of policies via the resource group attributes. In one such embodiment, by way of example only, a resource group attribute is included in the storage resource definition to associate a storage resource with one of the plurality of resource groups in a system configuration of the computing storage environment. Each storage resource can be independently assigned to a resource group such that the storage resource can be arbitrarily partitioned into collections that are meaningful subsets for management purposes. The authority to manage at least one of the plurality of resource groups can then be arbitrarily assigned to at least one user of the multiple users via configuration of a user resource scope attribute associated with the user account. Only those of the multiple users assigned a user resource scope that selects at least one of the plurality of resource groups are authorized to perform a management task on the objects assigned to the selected resource groups.

In addition to the foregoing exemplary embodiment, various other system and computer program product embodiments are provided and supply related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

The illustrated embodiments provide mechanisms for partitioning management of a variety of computing storage resources (possibly spread between multiple interconnected storage subsystems, for example) between multiple users. Pursuant to these mechanisms, exemplary embodiments are described that operate to assign users of the computing storage environment's configuration interface a user resource scope attribute, and assign storage resource objects in the system configuration a resource group attribute, as will be further illustrated. Such embodiments function to only allow users with a particularly designated user resource scope to operate on objects in a particularly designated resource group, this allowing a set of users to be limited to the management of a specific subset of configuration objects.

Figure 1:
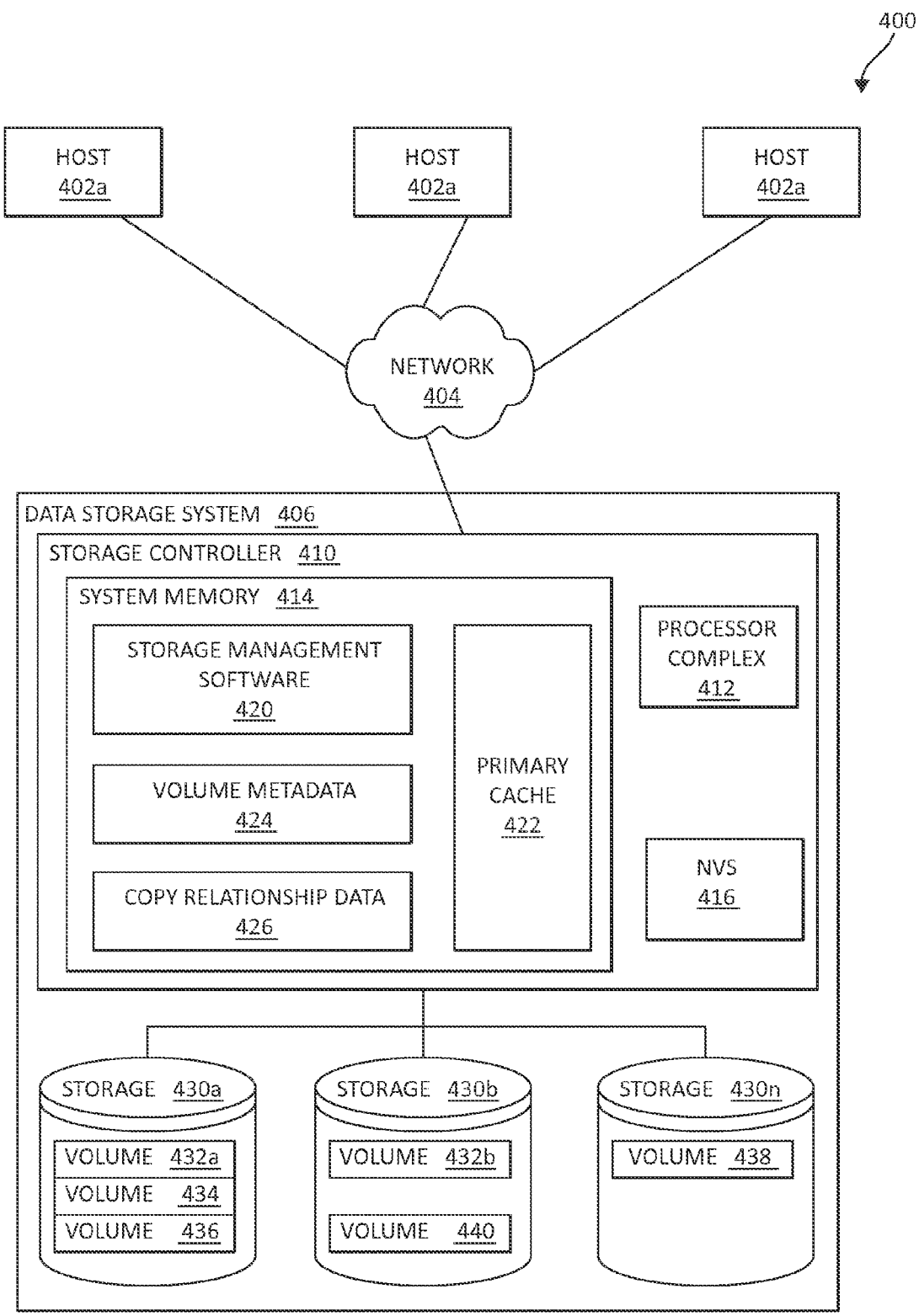
FIG. 1 is a block diagram illustrating a portion of an exemplary computing storage environment.

In reference to FIG. 1, one exemplary embodiment 400 of a computing environment including a data storage system 406 is illustrated in block diagram form and represents an exemplary computing environment for implementing the methods described herein. A network 404 connects one or more hosts 402 with a data storage system 406. Data storage system 406 receives input/output requests for writing/reading data from hosts 402, also referred to herein as a "write request" and "read request," and thereby serves as a networked storage resource for hosts 402. In one embodiment, data storage system 406 is implemented as IBM® System Storage™ DS8000™ (trademark of International Business Machines, Corp. or "IBM"). Network 404 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. Hosts 402 may be local or distributed among one or more locations and may be equipped with any type of fabric or network adapter (not shown in FIG. 1) to network 404, such as Fibre channel, FICON, ESCON, Ethernet, fiber optic, wireless, or coaxial adapters. Data storage system 406 is accordingly equipped with a suitable fabric or network adapter (not shown in FIG. 1) to communicate via network 404. Data storage system 406 is depicted in FIG. 1 comprising storage controller 410 and storage 430.

To facilitate a clearer understanding of the methods described herein, storage controller 410 is shown in FIG. 1 as a single processing unit, including processor complex 412, system memory 414 and nonvolatile storage ("NVS") 416, which will be described in more detail below. It is noted that in some embodiments, storage controller 410 is comprised of multiple processing units, each with their own processor complex and system memory, and interconnected by a dedicated network within data storage system 406. Storage 430 may be comprised of one or more storage devices, such as storage arrays, which are connected to storage controller 410 by a storage network.

In some embodiments, the devices included in storage 430 are connected in a loop architecture. Storage controller 410 manages storage 430 and facilitates the processing of write and read requests intended for storage 430. The system memory 414 of storage controller 410 stores program instructions and data which processor complex 412 may access for executing functions and method steps associated with managing storage 430. In one embodiment, system memory 414 includes storage management software 420 for executing storage management functions, including the methods and operations described herein. In some embodiments, system memory 414 is allocated for storing volume metadata 424 and copy relationship data 426, which are used for implementing certain virtualization mechanisms, described further below. As shown in FIG. 1, system memory 414 may also include a primary cache 422 for storage 430, also referred to herein as a "cache memory", for buffering "write data" and "read data", which respectively refer to write/read requests and their associated data. In one embodiment, primary cache 422 is allocated in a device external to system memory 414, yet remains accessible by processor complex 412 and serves to provide additional security against data loss, as will be described in detail with respect to FIG. 2 below.

In some embodiments, primary cache 422 is implemented with a volatile memory and coupled to processor complex 412 via a local bus (not shown in FIG. 1) for enhanced performance of data storage system 406. The NVS 416 included in data storage controller is accessible by processor complex 412 and serves to provide additional security against data loss, as will be described in detail with respect to FIG. 2 below. NVS 416, also referred to as a "persistent" cache, or "cache memory", is implemented with nonvolatile memory that may or may not utilize external power to retain data stored therein. In some embodiments, a backup power source (not shown in FIG. 1), such a battery, supplies NVS 416 with sufficient power to retain the data stored therein in case of power loss to data storage system 406. In certain embodiments, the capacity of NVS 416 is less than the total capacity of primary cache 422.

Storage 430 may be physically comprised of one or more storage devices, such as storage arrays. A storage array is a logical grouping of individual storage devices, such as a hard disk. In certain embodiments, storage 430 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

As shown in FIG. 1, a logical volume, or simply "volume," may have different kinds of allocations. Storage 430a, 430b and 430n are shown as ranks in data storage system 406, and are referred to herein as rank 430a, 430b and 430n. Ranks may be local to data storage system 406, or may be located at a physically remote location. In other words, a local storage controller may connect with a remote storage controller and manage storage at the remote location. Rank 430a is shown configured with two entire volumes, 434 and 436, as well as one partial volume 432a. Rank 430b is shown with another partial volume 432b. Thus volume 432 is allocated across ranks 430a and 430b. Rank 430n is shown as being fully allocated to volume 438—that is, rank 430n refers to the entire physical storage for volume 438. From the above examples, it will be appreciated that a rank may be configured to include one or more partial and/or entire volumes. Volumes and ranks may further be divided into so-called "tracks," which represent a fixed block of storage. A track is therefore associated with a given volume and a given rank.

As mentioned previously, one kind of virtualization mechanism that may be implemented on data storage system 406 is a copy relationship. In a copy relationship, data on one rank may be automatically copied to another rank so that access to data volumes can be provided from two different sources. In one embodiment, a copy relationship involves a physical point-in-time copy operation, in which all the data from source volumes to target volumes are physically copied so that the target volume has a copy of the data as of a point-in-time. In some embodiments, a copy relationship involves a logical point-in-time copy operation, in which a logical copy of the source volume is made, after which data are only copied over when necessary. The logical copy relationship provides the advantageous effect of deferring the physical copying, and is performed to minimize the time during which the target and source volumes are inaccessible. One example of a copy relationship is known as FlashCopy® (FlashCopy is a registered trademark of International Business Machines, Corp. or "IBM"). FlashCopy® involves establishing a logical point-in-time relationship between source and target volumes on different ranks.

Once the copy relationship is established, hosts may then have immediate access to data on the source and target volumes, and the data may be copied as part of a background operation. Any new modification of data to tracks on the source rank cause those modified tracks on the source rank to be written to the target rank. Reads to any tracks in the cache that have not been updated with modified data from the source causes the source track to be staged to the cache before access is provided to the track from the cache. A copy relationship may also be established with a target volume that is a virtual volume. For example, a FlashCopy® to a virtual target volume is referred to as FlashCopy SE. It is noted that write data associated with or transferred as a result of a copy relationship are referred to herein as being "involved" in a copy relationship. Information about the logical tracks of a copy relationship are stored in volume metadata 424.

Figure 2:
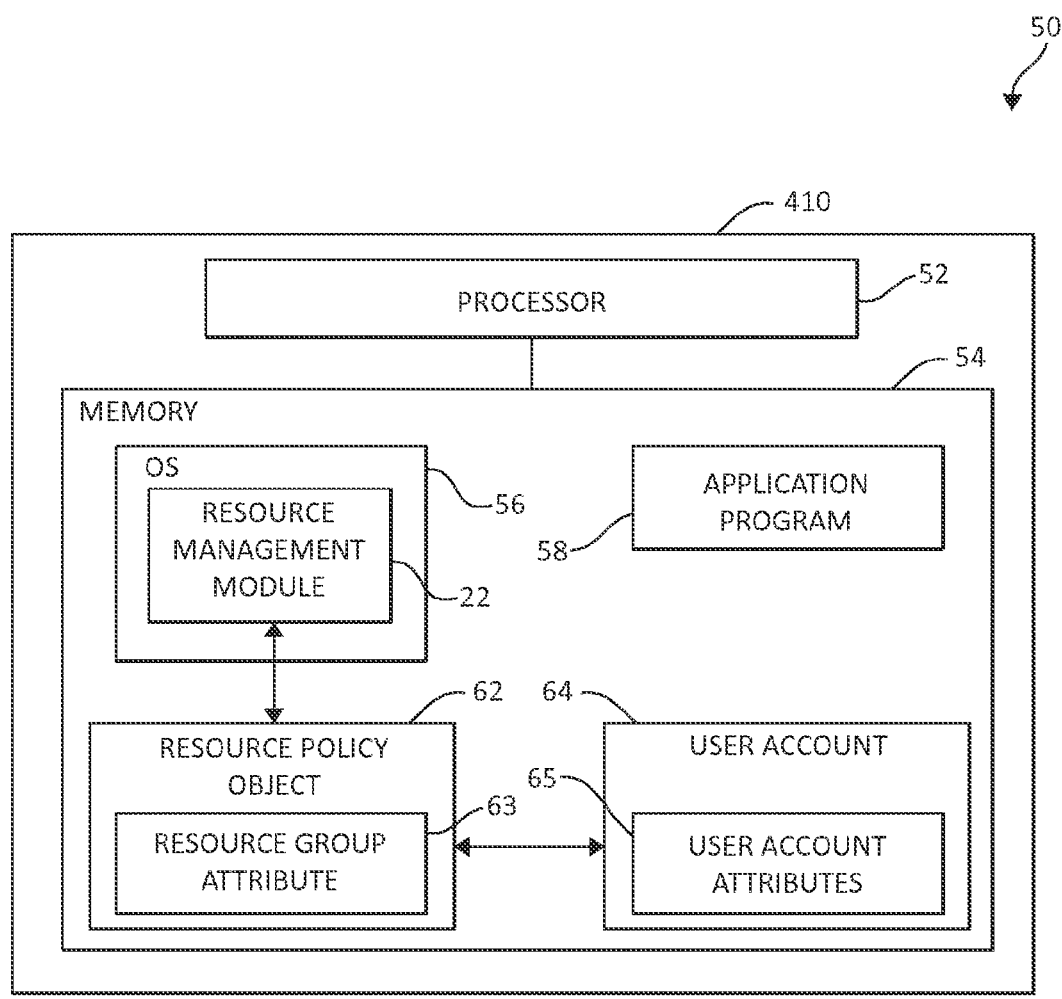
FIG. 2 is a block diagram illustrating an exemplary portion of a storage controller of the exemplary computing storage environment depicted in FIG. 1.

Turning now to FIG. 2, an exemplary portion 50 of storage controller 410 as also seen in FIG. 1, previously, is illustrated. Portion 50 of storage controller 410 is operable in a computer environment as a portion thereof, in which mechanisms of the following illustrated embodiments may be implemented. It should be appreciated, however, that FIG. 2 is only exemplary and is not intended to state or imply any limitation as to the particular architectures in which the exemplary aspects of the various embodiments may be implemented. Many modifications to the architecture depicted in FIG. 2 may be made without departing from the scope and spirit of the following description and claimed subject matter.

In the illustrated embodiment, storage controller 410 includes a processor 52 and a memory 54, such as random access memory (RAM). The storage controller 410 may be operatively coupled to several components not illustrated for purposes of convenience, including a display, which presents images such as windows to the user on a graphical user interface, a keyboard, mouse, printer, and the like. Of course, those skilled in the art will recognize that any combination of the above components, or any number of different components, peripherals, and other devices, may be used with the storage controller 410.

In the illustrated embodiment, the storage controller 410 operates under control of an operating system (OS) 56 (e.g. AIX, z/OS, OS/2, LINUX, UNIX, WINDOWS, MAC OS) stored in the memory 54, and interfaces with the user to accept inputs and commands and to present results. In one embodiment of the present invention, the OS 56 facilitates management partitioning functionality according to the present invention. To this end, OS 56 includes a resource management module 22 as previously described, which may be adapted for carrying out various processes and mechanisms in the exemplary methods described following.

The Resource Manager is the 'application' of interest here and it is compiled by the manufacturer before it is put on the machine. The resource management module program may be written in a programming language such as COBOL, PL/1, C, C++, JAVA, ADA, BASIC, VISUAL BASIC, ASSEMBLER, on any other programming language to be translated into code that is executable by the processor 52. In one embodiment, the functionality of the Resource management module may be located in the storage controller nodes.

Data structures 62 and 64 (resource group object 62, and user account object 64, respectively) are shown interactional with the resource management module 22 in memory 54. Data structure 62 includes one or more resource group attributes 63 (such as a resource group number, a resource group label, and other resource group policy attributes as will be further described). Data structure 64 includes one or more user account attributes 65 (such as a user identification (ID), password, and a user resource scope (URS) as will be further described). A portion of the functionality of the resource management module 22 is, in one embodiment, to correlate the data structures 62 assigned to a particular storage resource(s), including resource group attributes 63 previously described, and data structures 64 assigned to a particular user account object, including the user account attributes 65 as previously described.

To further implement and execute mechanisms and processes according to the present invention, OS 56, in conjunction with the resource management module 22, memory 54, processor 52, data structures 62 and 64, and other computer processing, networking, and storage components, may implement management partitioning mechanisms according to the present invention as will be further described. As one of ordinary skill in the art will appreciate, the mechanisms implemented by resource management module 22 as presently illustrated may be implemented in various forms and architectures. Accordingly, the illustration of resource management module 22 (as well as data structures 62 and 64) in the present figure is again intended to demonstrate logical relationships between possible computing components in the 410, and not to imply a specific physical structure or relationship.

In one embodiment, instructions implementing the operating system 56, and the resource management module 22 are tangibly embodied in a computer-readable medium, which may include one or more fixed or removable data storage devices, such as a zip drive, disk, hard drive, DVD/CD-ROM, digital tape, solid state drives (SSDs), etc. Further, the operating system 56 and the resource management module comprise instructions which, when read and executed by the computing storage environment to perform the steps necessary to implement and/or use the present invention. Resource management module and/or operating system 56 instructions may also be tangibly embodied in the memory 54 and/or transmitted through or accessed by networks attached to the storage controller (not shown) via various components.

As such, the terms "article of manufacture," "program storage device" and "computer program product" as may be used herein are intended to encompass a computer program accessible and/or operable from any computer readable device or media. Embodiments of the present invention may include one or more associated software application programs 58 that include, for example, functions for managing a distributed computer system comprising a network of computing devices, such as a SAN or NAS as previously described. Accordingly, processor 52 may comprise one or more storage management processors (SMP). The program 58 may operate within a single computer and/or a portion of the storage controller 410 or as part of a distributed computer system comprising a network of computing devices. The network may encompass one or more computers connected via a local area network and/or Internet connection (which may be public or secure, e.g. through a virtual private network (VPN) connection), or via a fibre channel SAN or other known network types as will be understood by those of ordinary skill in the art, or via proprietary interconnection network that is defined by a given vendor to integrate components comprising a distributed computer system. As one of ordinary skill in the art will appreciate, the portion of the storage controller 410 of portion 50 may comprise computing components visible throughout the distributed computer system, such as components conforming to a lightweight directory access protocol (LDAP). In this manner, the data structure 64 may be listed in an LDAP server, for example.

The portion 50 may, in one embodiment, be adapted to define user accounts (having data such as the aforementioned user ID, password, user resource scope), and provides a mechanism for the system administrator to assign a particular user resource scope to the user account. The functionality of the resource group and user resource scope attribute in relation to the present invention and claimed subject matter will now be further described in more detail.

In one embodiment, by way of example only, storage controller 410 may be adapted for partitioning management of a plurality of storage resources in a computing storage environment across multiple users by a processor device. The storage controller 410 may include assigning each storage resource to a resource group (RG). Each storage resource object that can be associated with a resource group has a resource group attribute that contains the resource group number of its associated resource group. The resource group object may have other attributes that define policies relative to how the resources in the resource group can be managed. The resource group object, in turn, may have a resource group label attribute that contains a unique identifier for the resource group.

In one embodiment, the resource group label is a text string that is semantically structured to allow hierarchical relationships between the resource groups. The user account information (such as the user ID, for example), in turn, may have a user resource scope attribute that contains a resource scope that can be used to test whether the user has access to a given resource group. The resource scope may be implemented with a similar semantic structure as a resource group label, except that it may contain "wildcard" characters allowing the resource scope to specify a specific subset of the hierarchy of resource groups. For purposes of the present invention, the user resource scope (URS) may be considered a pattern which is a string that may contain wild cards or other mechanisms to define string matching patterns. Additionally a resource group has a resource group label (RGL) attribute which may be considered a string. The RGL string will be compared to the user's URS pattern to determine whether the user has access to the storage resources associated with the resource group. Other implementations might use different mechanisms to match users to resource groups including different pattern matching mechanisms or mechanisms not based on patterns and strings. The user ID possessing a user resource scope matching the resource group label of a resource group is authorized to perform any of creating, deleting, modifying, controlling, and managing of storage resources with an association to that resource group. One resource group may be defined as a default resource group containing multiple policy attributes set to prescribe the behavior of the storage system prior to the installation of code onto the storage system.

One or more users may be designated as an administrator having authorization to perform actions to configure the storage system to activate the enforcement any of the numerous resource group policies and to limit the scope of user access including the ability to create, modify, delete, and assigning the user resource scope (URS) to the user ID via a user directory accessible by one or more storage subsystems in the computing storage environment. The user directory may conform to a lightweight directory access protocol (LDAP).

In one embodiment, by way of example, when a user with a particular assigned user resource scope (URS) creates a storage resource in the system configuration, the storage resource must be assigned to a resource group whose resource group label (RGL) attribute matches the requesting user's URS attribute value. For example if the user's URS is "IBM*", the user could associate the storage resource he creates with any configured resource group whose RGL matches the "IBM*" RGLs that match "IBM*" include, but are not limited to, "IBM", "IBM123", "IBM.AIX.System3.DB2.Pool3" etc. Once the resource is created, the system ensures that only user IDs that have a user resource scope that matches RGL attribute value in the resource group associated with a given storage resource are allowed to modify, control, or delete the object representing the storage resource according to the management task to be performed.

To support the integration of this management scheme into an existing system, one resource group (with RGL="PUBLIC", for example) may be designated as a default resource group that any user resource scope is considered to match. As such, for example, if any pre-existing storage resources are assigned to the default resource group, and if any pre-existing user accounts are assigned a URS set to PUBLIC, then when a level of firmware that supports the present invention is installed, there is no perceived change to the access to storage resources provided to any user. Since a URS=PUBLIC matches a RGL=PUBLIC, these users have access to all existing resource objects. At some later time, the administrator can change the user ID's associated URS to a value that matches the specific resource groups to which user is to have access. At that point, the user assigned a resource token "IBM*" has access to resources in any resource groups that have RGLs matching "IBM*" and additionally to the PUBIC resource group. At this point, the users still have access to all the pre-existing storage resources that are initially place in PUBLIC. Finally, having established the user's correct URS, the storage resources can be migrated from the PUBLIC resource group to a specific resource group that contains the appropriate resource group policy attributes for these associated resources. Once the storage resources are assigned to their new resource group, the policies defined by that resource group then apply to the storage resource.

To further support management of the system, a user ID assigned a special role may be authorized to change the resource group attribute of an object. This capability is required on an existing system in order to move existing objects out of the default resource group which has uncontrolled access. Accordingly, such a user can transfer existing objects from the default resource group to a non-default resource group. This user may also be authorized to reassign resources between resource groups or return resources to the default resource group as required. This capability might be inherent in the administrator role, for example. Alternatively, the role may be explicitly associated with another defined user role.

In light of the mechanisms of the illustrated embodiments, when a new system is configured from scratch, the administrator need only assign the user IDs a user resource scope and subsequently, the objects created in the system configuration are inherently confined to the resource group within the scope of the creating user's resource scope. This reduces administrative efforts while providing very clear delineation of ownership of resources within the system. Moreover, a set of user IDs with the same URS assignment can share management of a given set of resource groups and their associated storage resources allowing a generalized mechanism to localize the management of a specific subset of storage resources to a specific set of user IDs. Moreover, the users are capable of creating new storage resources, but only within the scope of their management domain.

A user ID's assigned user resource scope may be adapted to be generally common across a complete multi-site, multi-system computing environment, such as multiple interconnected storage subsystems. For instance, the user resource scope may be assigned in a user directory such as LDAP as previously described. This allows consistent definition and management of resource groups that can span multiple storage controllers and can additionally span multiple installation sites. Even without a centralized point of control for the assignment of user resource scopes such as LDAP, a consistent schema of resource group labels (RGLs) need only be defined such that it can be configured consistently across the participating storage products such that the same RGL has the same connotation no matter what storage system it is configured on. In an implementation with multiple varieties of hosts and multiple interconnected sites, where storage for these hosts spans multiple storage controllers and multiple sites, a set of users may be assigned a user resource scope for the resource groups associated with one particular management domain, and another set of users may be assigned a user resource scope for the resource groups associated with another particular management domain. In this way, the same resource group exists, and is visible across multiple storage controllers and multiple sites. The choice of the desired or required management domains is at the discretion of the administrators who may define the management partitions to suit the needs of the business controlling the computing environment.

Figure 3:
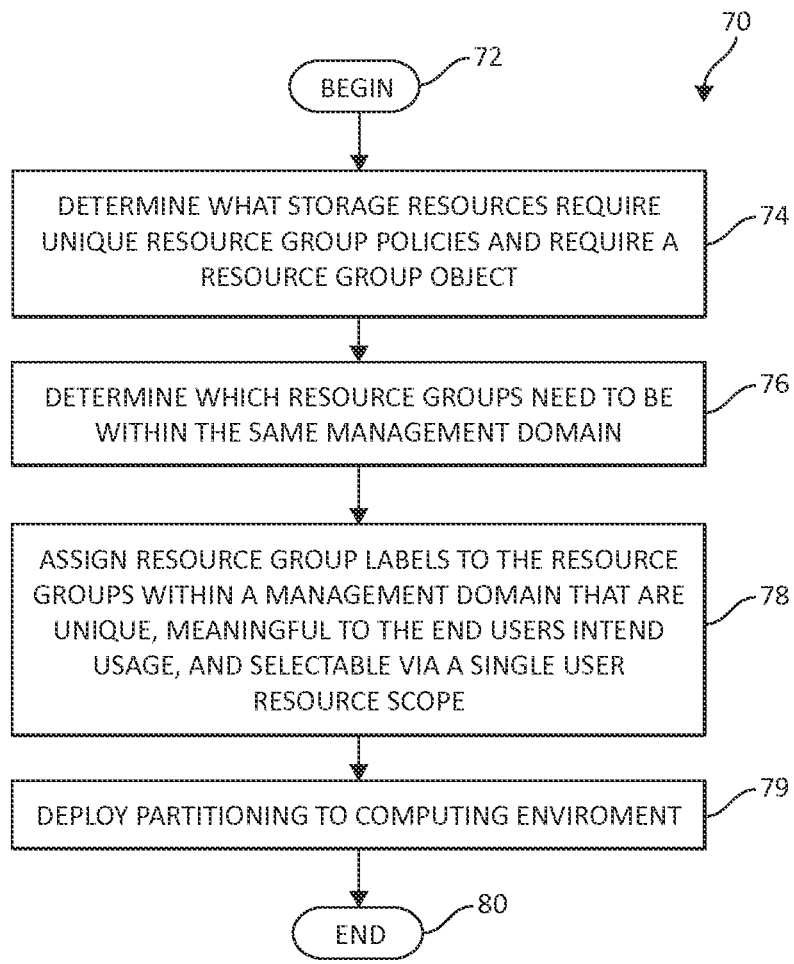
FIG. 3 is a flow chart diagram of an exemplary method for partitioning management of a variety of storage resources across multiple users.
Figure 4:
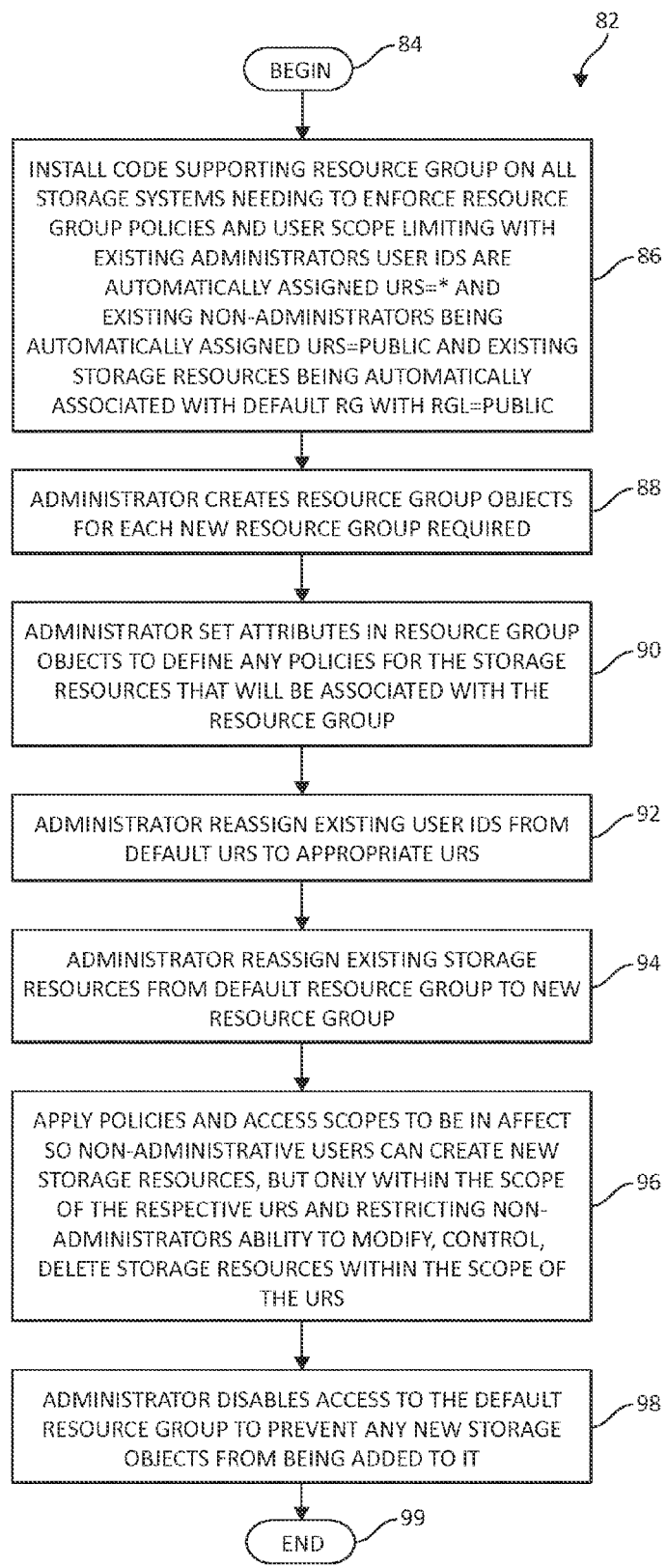
FIG. 4 is an additional flow chart diagram of an exemplary mechanism of operation of the method depicted in FIG. 3.
Figure 5:
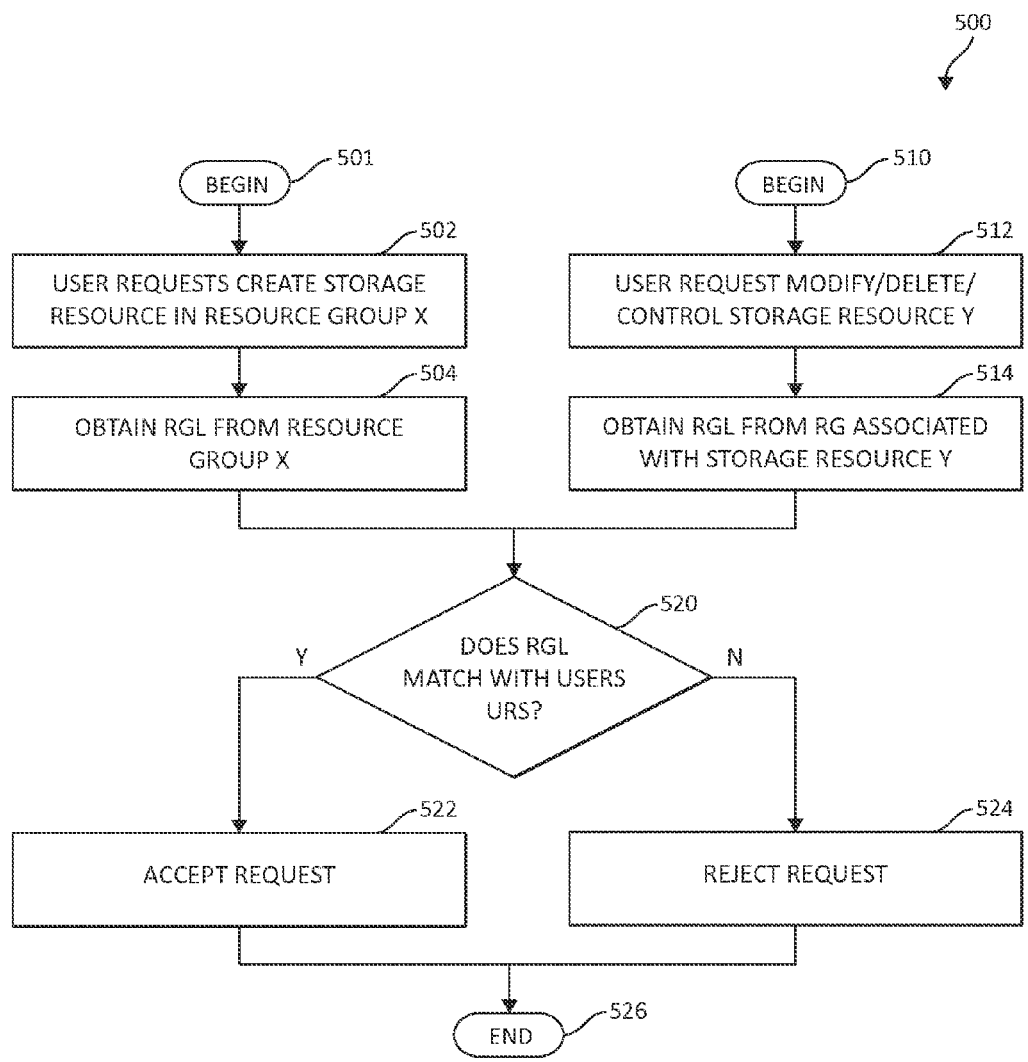
FIG. 5 is an additional flow chart diagram of an additional exemplary mechanism of operation of the method depicted in FIG. 3.

Turning to FIG. 3, following, an exemplary method 70 for partitioning management of system resources in a computing storage environment across multiple users is illustrated in flow chart diagram format. FIGS. 4 and 5, later following, illustrate various exemplary modes of operation of the functionality first depicted in FIG. 3. As one of ordinary skill in the art will appreciate, various steps in the method 70, and steps in the methods 80 and 99 in FIGS. 4 and 5, respectively, may be implemented in differing ways to suit a particular application. In addition, the described methods may be implemented by various means, such as hardware, software, firmware, or a combination thereof operational on or otherwise associated with the computing storage environment. For example, the methods may be implemented, partially or wholly, as a computer program product including a computer-readable storage medium having computer-readable program code portions stored therein. The computer-readable storage medium may include disk drives, flash memory, digital versatile disks (DVDs), compact disks (CDs), and other types of storage medium.

Method 70 begins (step 72) with a determination as to what storage resources require unique resource group policies and require a resource group object (Step 74). A determination as to which resource groups need to be within the same management domain is the step (Step 76). Resource group labels are assigned to the resource groups within a management domain that are unique, meaningful to the end users intend usage, and selectable via a single user resource scope (Step 78). The final step is to deploy partitioning to the computing environment (Step 79). The method then ends (step 80).

The method 70 described includes an assessment of the total computing environment to determine where the end user needs to partition storage resources into domains that will have common resource group policies within a domain. This assessment factors in the unique requirements of the business using the computing environment as well as the functionality provided by any policy attributes supported in the resource group object on the storage subsystems. Once these partitions are determined, the next step proceeds to group these policy domains into larger management domains that are intended to be managed by a particular set of users. Finally, a set of resource group labels are chosen, one for each resource group. The RGLs should be unique within the computing environment to allow them to be used globally across storage subsystems and across customer sites. The RGLs should also generally have some intrinsic meaning to the end user, typically related to the intended usage of the storage resources within the group. For instance, one group of volumes might be a set of volumes at a recovery site (site 2=S2) which are a synchronous mirror (e.g. Metro-Mirror=MM) of a set of volumes at the primary site containing data for a particular database (DB2) that is processing a specific customer application (payroll) and the label could be S2/MM.DB2.Payroll. The RGLs must also be chosen so that the set of RGLs within a management domain can be selected by a single URL. For sample say that there is also a group for MM.DB2.Payroll.S2 and a set of users are to manage this resource across both sites. The URL MM.DB2.Payroll.* would allow such a user to access the resources in both these resource groups. Once the overall partitioning plan is determined, the next step would be to deploy this plan to the computing environment as will be discussed in FIG. 4.

FIG. 4, following, illustrates a first exemplary method 82 of operation, considering the functionality depicted previously in FIG. 3, in particular the deployment phase in step 4. Method 82 begins (step 84) with Step 86 by installing code supporting resource group on all storage systems needing to enforce resource group policies and user scope limiting with existing administrators user IDs being automatically assigned URS=*, existing non-administrators being automatically assigned URS=PUBLIC, and existing storage resources being automatically associated with default RG with RGL=PUBLIC. The administrator creates resource group objects for each new resource group required (Step 88). The administrator sets attributes in the resource group objects to define any policies for the storage resources that will be associated with the resource group (Step 90). The administrator reassigns existing user IDs from default URS to appropriate URS (Step 92). Following this step, the administrator reassigns existing storage resources from default resource group to new resource group (Step 94). The next step consists of the storage controller applying the policies and access scopes in effect so non-administrative users can create new storage resources, but only within the scope of the respective URS and restricting non-administrators ability to modify, control, delete storage resources within the scope of the URS (Step 96). The administrator disables access to the default resource group to prevent any new storage objects from being added to it (Step 98). The method ends with step 99.

Thus, method 82 may include an administrator role with the following capabilities as previously mentioned; a URS=* has authority to access all storage resources in all RGs, the administrator may create, modify, delete resource groups, the administrator may change the RG on any storage resource, and the administrator may assign a URS to non-administrator user accounts. The method includes prohibiting a non-administrator user account from performing the following as previously discussed: the ability to change any user's URS or access scope, the ability to create, delete, or modify a resource group (the resource group policies in the RG are set by the administrators), the ability to change the resources in a resource group. The existing resources are partitioned to the RG's by administrators and new resources created by non-administrator must be in a RG that is within the scope of their specified URS.

The method includes deploying non-disruptively into an existing environment. The method 82 described by details relating to the deployment as mentioned in step 86 where code to support this functionality is first installed on any storage systems providing policy enforcement and user scope limiting. With the installation of the code, the operation of the storage subsystem is such that all pre-existing storage resources are automatically associated with the default resource group which has RGL=PUBLIC and policies which implement the behavior of the storage subsystem as existed prior to the installation of this code. Additionally all non-administrative users are assigned a URS=PUBLIC, such that they retain access to all existing resources. Also all administrative users are assigned a URS=* such that they have access to any resource group that may be created in the future. Subsequently, the administrators may create resource groups needed to implement the new partitioning desired and configure the attributes in the resource groups to implement the desired policies for the storage resources to be assigned to the resource groups. The administrator redefines the existing users so that that the administrators have a URS that is consistent with the administrator's future intended access copy. As previously discussed, the users retain access to storage resources in PUBLIC regardless of their URS so there is no loss of access to the existing storage resources. Finally, the administrators may move the existing public resources from PUBLIC to the intended resource group resulting in the activation of the resource group and URS for any storage resource group not in the default resource group. Non-administrator user IDs are now limited to operating on only resources within the scope of their URS and storage resources in the non-default resource groups are protected from access by user IDs that do not have the resource groups within the scope of the URS. As a final step, it is possible to disable the ability to add additional storage resources to the default resource group which is required in the initial transition phase or for users who install the code to support the disablement ability but do not intend to ever configure resource groups. However, once the system is configured for the resource groups, disabling the default resource group prevents any storage resources from being commonly accessible to all users and limits non-administrative users to create objects only in non-default resource groups.

Turning now to FIG. 5, method 500 is illustrated beginning (step 501 and 510) with the user either requesting to create a storage resource in Resource Group X (step 502) or the user requesting to modify, delete, or control an existing storage resource Y (step 512). The next step, proceeding from step 502, includes obtaining the RGL from Resource Group X (step 504) or, proceeding from step 512, includes obtaining the RGL from the Resource Group associated with storage resource Y (step 514). Both of these entry methods proceed to the next step of determining whether the obtained RGL matches with the user's URS (step 520). If "no" the request is rejected (step 524) or if "yes" the request is accepted (step 522). The method ends (step 526). The method of 500 allows two entry method scenarios. As previously discussed, the method to create storage resources includes the user specifying the desired Resource Group to put the object into. If the desired Resource Group is not specified by the user, the default resource group is assumed to be specified in order to obtain the RGL needed to determine access authority. If the method commences from the user requesting to modify, control, or delete, the user only needs to specify the storage resource and the existing storage configuration identifies the storage resource's resource group. A modification may include changing the size of a logical volume. A control operation may include using the volume in a copy relationship.

Additionally, a resource group may be used as a mechanism to aggregate a number of storage resources to a single policy object which then contains a number of policy attributes. However, there are embodiments where the resource group label, and any other policy attributes desired, may be attributes of each storage resource thereby avoiding the need for a resource group object. In one embodiment, managing a collection as an entity may be preferred over managing each storage resource independently. Adding the volumes to a limited number of resource groups that might be associated with a few tenants using the storage subsystem and specifying policies in those few resource groups may be preferred to having to set up the policies in every one of the individual logical volumes.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagram in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A method of partitioning management of a plurality of storage resources in a computing storage environment across a plurality of users by a processor device, comprising:

assigning a resource group attribute to a storage resource object representing at least one of the plurality of storage resources, wherein the resource group attribute includes a selectable value indicating a resource group object to which the storage resource object is associated;

providing a resource group label in the resource group object, the resource group label being a string having no wildcards;

assigning a user resource scope to a user ID, wherein a value of the user resource scope provides a mechanism to match to the resource group label, the user resource scope being a pattern of a string adapted to include wildcards for comparison to the resource group label to determine a match between the user resource scope and the resource group label, whereupon the user ID is authorized to perform one of creating, deleting, modifying, controlling, and managing storage resources with an association to a resource group in the plurality of storage resources;

designating at least one of the plurality of users as an administrator having authorization to perform actions to configure the plurality of storage resources and activating an enforcement of a plurality of resource group policies and limiting a scope of access of at least one of the plurality of users;

creating the resource group, wherein at least one of the resource group label being assigned to the resource group;

modifying the resource group, wherein a plurality of policy attributes are changed in the resource group;

deleting the resource group not being associated with at least one of the plurality of storage resources;

changing the association of the at least one of the plurality of storage resources to the resource group;

performing at least one of assigning and modifying the user resource scope on a non-administrative user IDs; and performing at least one of enabling and disabling the creation of a plurality of objects in a default resource group.

2. The method of claim 1, further including assigning the resource group a plurality of policy attributes prescribing a behavior of the plurality of storage resources prior to installation of code on the computing storage environment, wherein the plurality of storage resources are assigned to the resource group upon installation of code with a plurality of non-administrative user IDs adapted to access the plurality of the storage resources by assigning a default user resource scope matching a default resource group label, further wherein the behavior of the plurality of the storage resources is identical before and after installing the code on the computing storage environment.

3. The method of claim 1, further including limiting access of the user resource scope to the plurality of storage resources by designating the resource group as a default resource group, wherein the default resource group is adapted to authorize the plurality of users to perform management tasks, further wherein at least one of the plurality of users may be assigned a new resource scope while maintaining access to the plurality of storage resources in both the default resource group and the resource group being assigned.

4. The method of claim 1, further including assigning the user resource scope to the user ID via a user directory accessible by a plurality of storage subsystems in the computing storage environment, wherein the user directory conforms to a lightweight directory access protocol (LDAP).

5. The method of claim 1, further including assigning the resource group attribute to an object representing at least one logical volume of the computing environment.

6. The method of claim 1, further including configuring a schema for assigning resource group labels to resource groups and user resource scopes to user IDs such that a multiplicity of resource groups may be managed by a set of users sharing a common user resource scope that matches an associated resource group label of the multiplicity of resource groups.

\* \* \* \* \*